Figure 1:
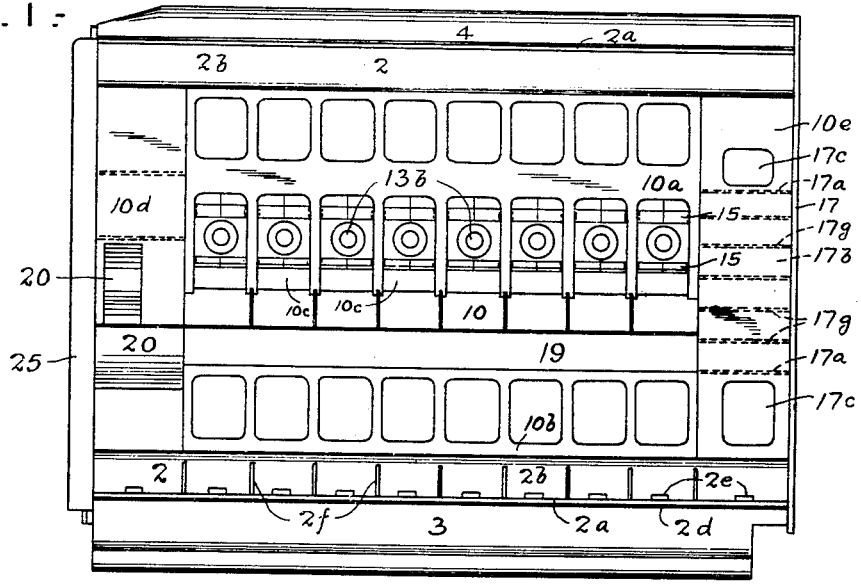

Nov. 1, 1949  E. CHAPMAN ET AL  2,486,927
ENGINE FRAME CONSTRUCTION
Filed Jan. 6, 1945  14 Sheets-Sheet 1

INVENTORS
Everett Chapman
Joseph Barraja-Frauenfelder
BY
S. C. Yeaton
ATTORNEY

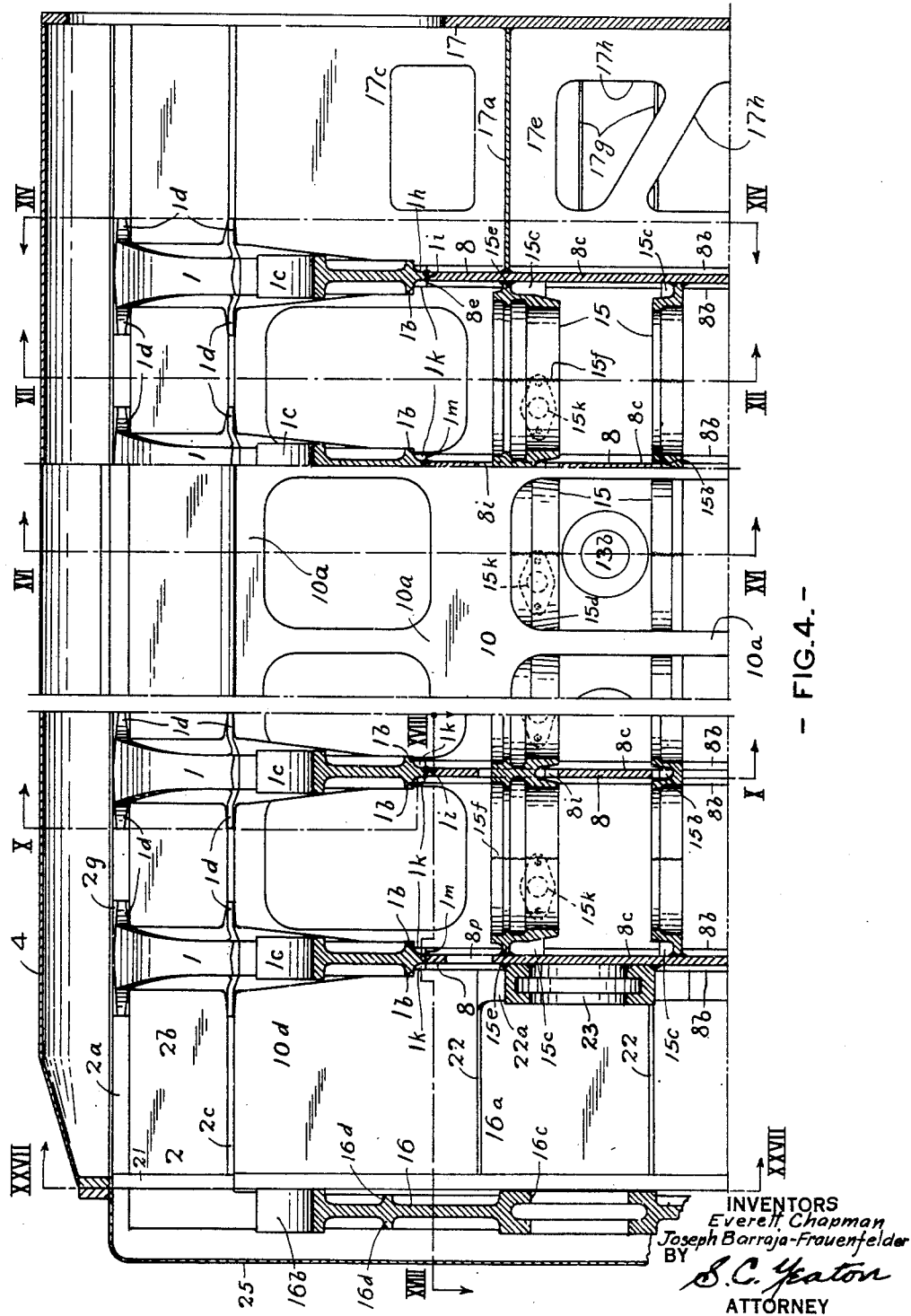

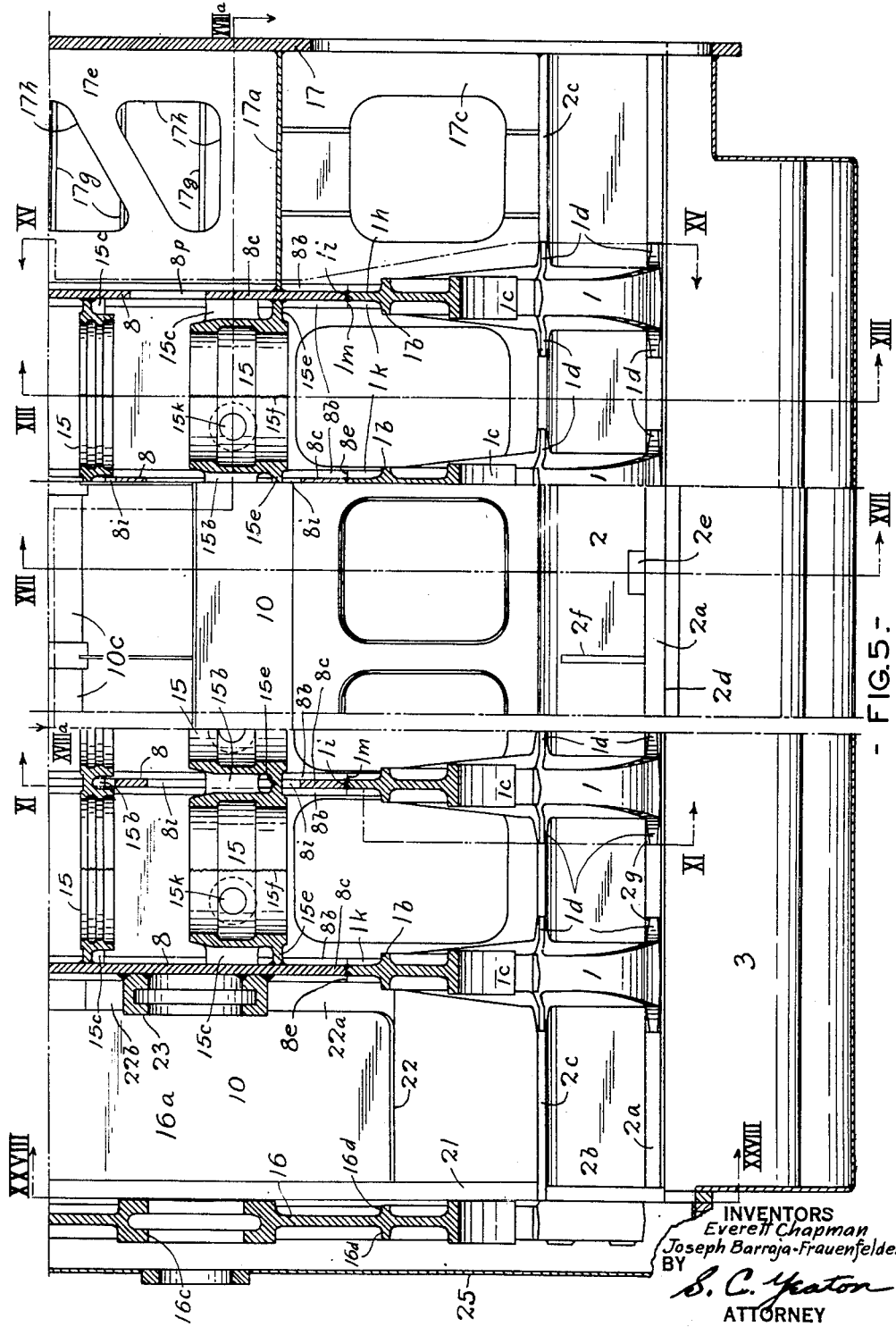

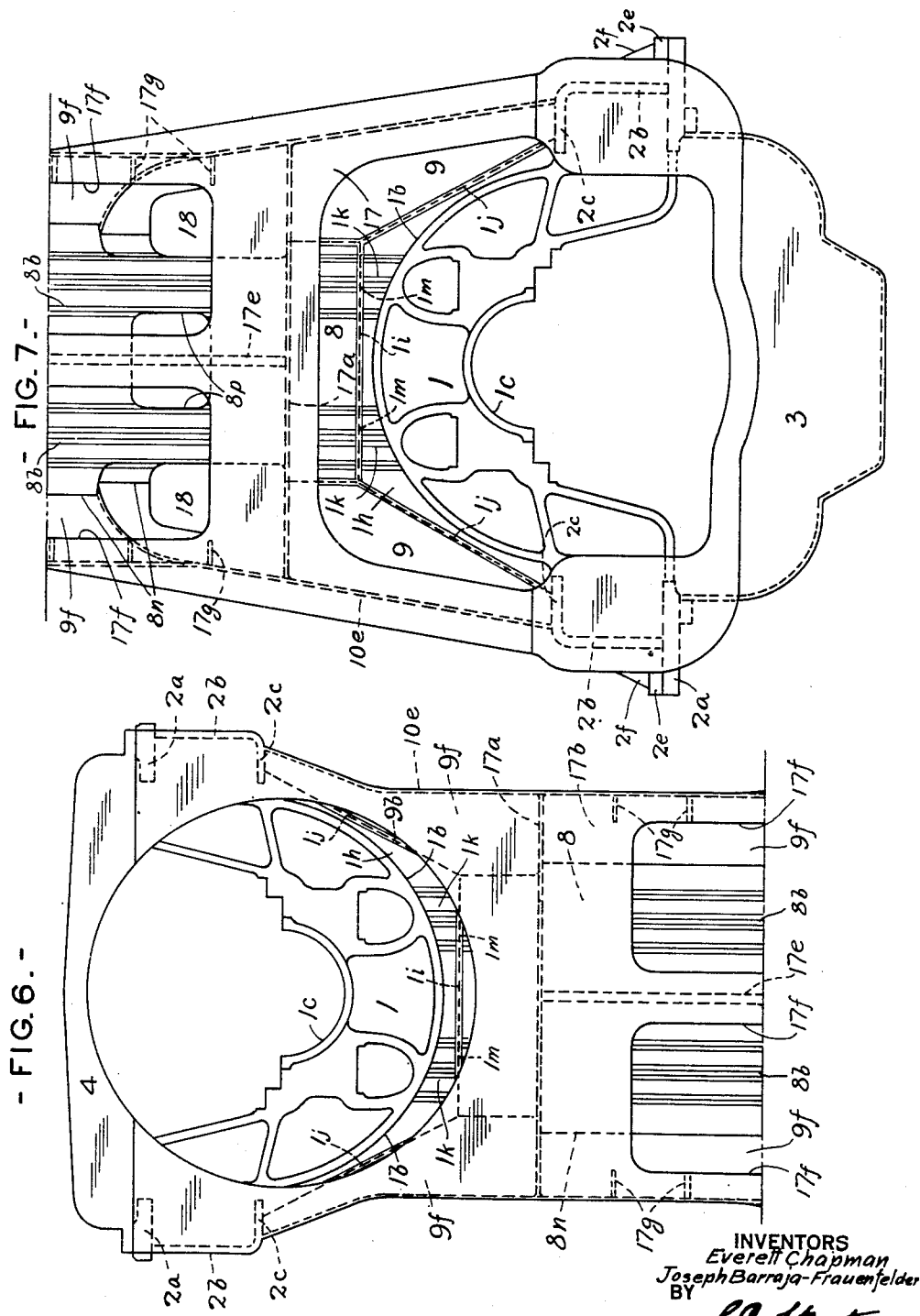

Nov. 1, 1949　　　　E. CHAPMAN ET AL　　　　2,486,927
ENGINE FRAME CONSTRUCTION
Filed Jan. 6, 1945　　　　　　　　　　　　　　14 Sheets-Sheet 5
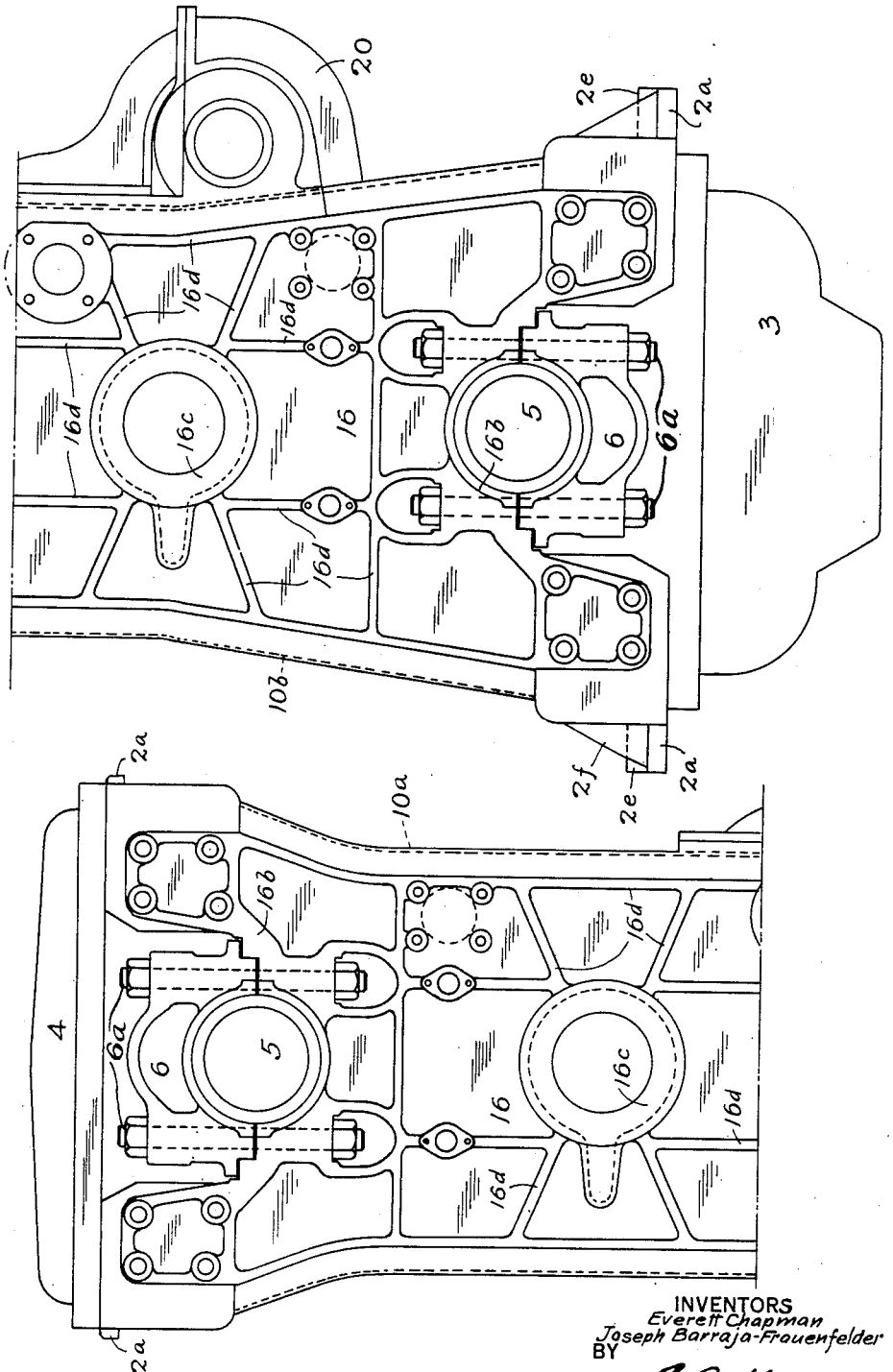
INVENTORS
Everett Chapman
Joseph Barraja-Frauenfelder
BY
S. C. Yeaton
ATTORNEY

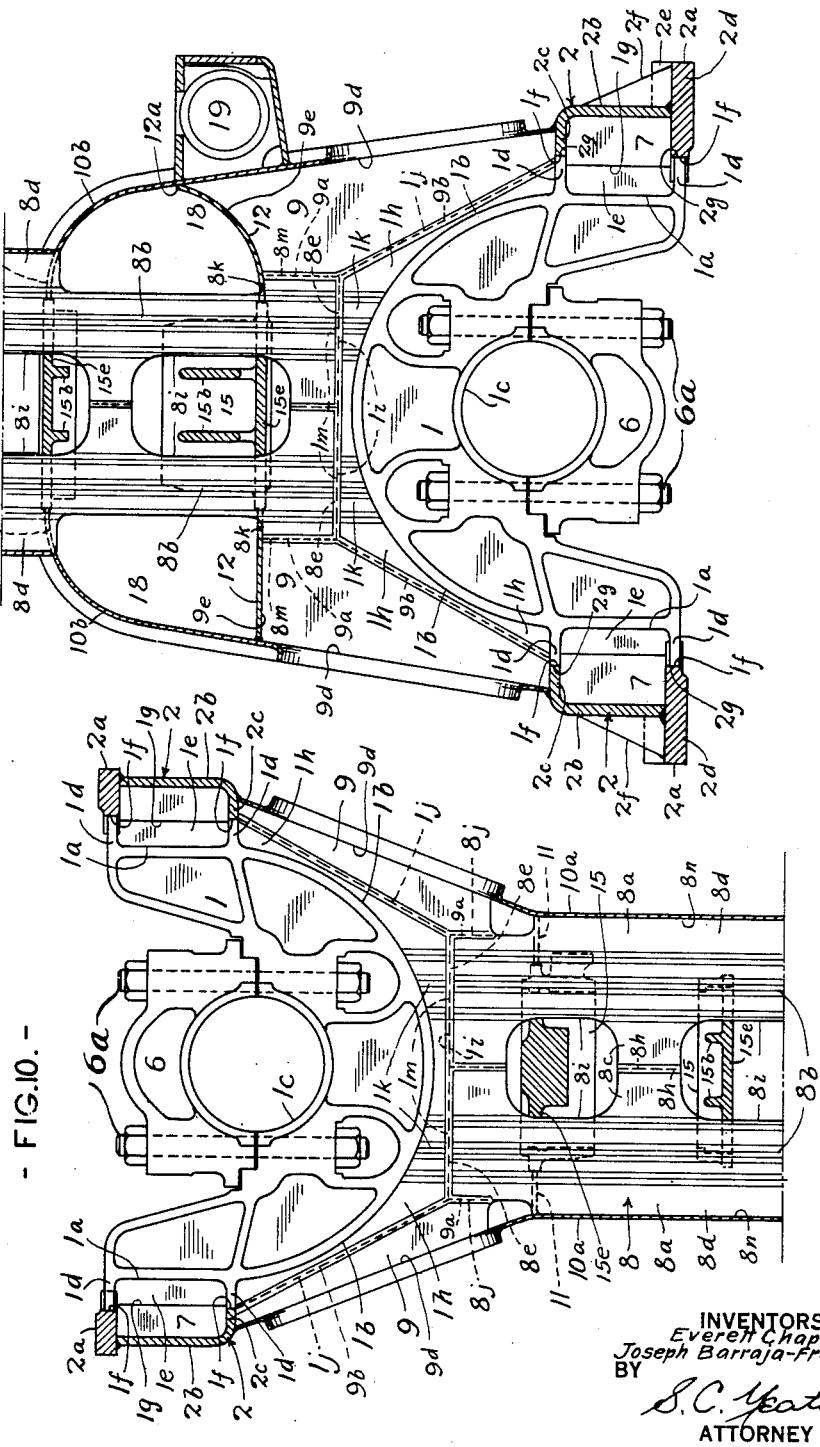

Nov. 1, 1949  E. CHAPMAN ET AL  2,486,927
ENGINE FRAME CONSTRUCTION
Filed Jan. 6, 1945  14 Sheets-Sheet 7
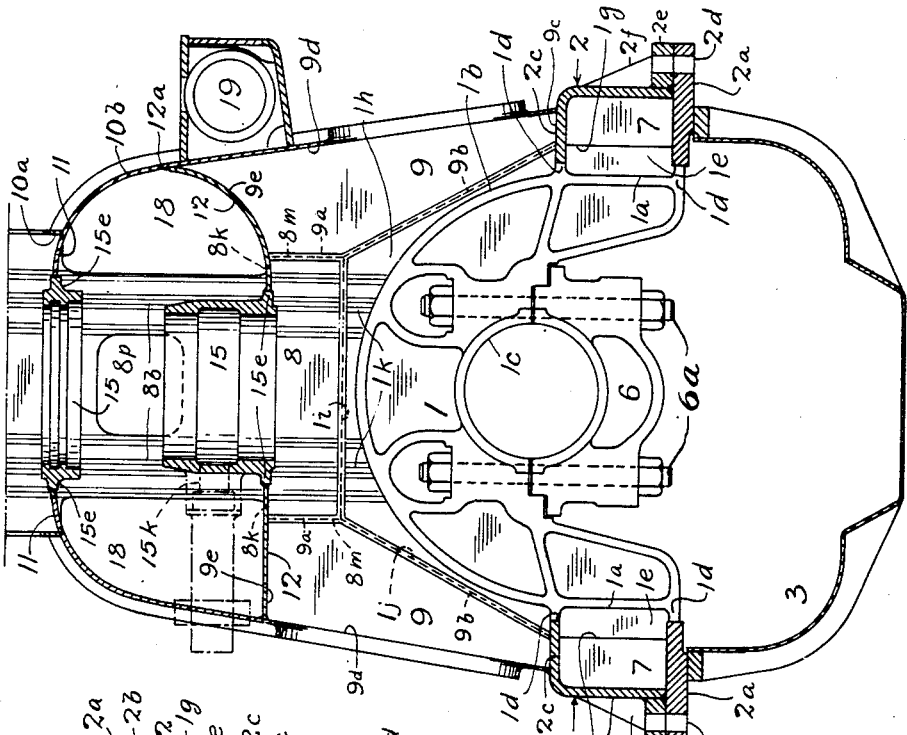
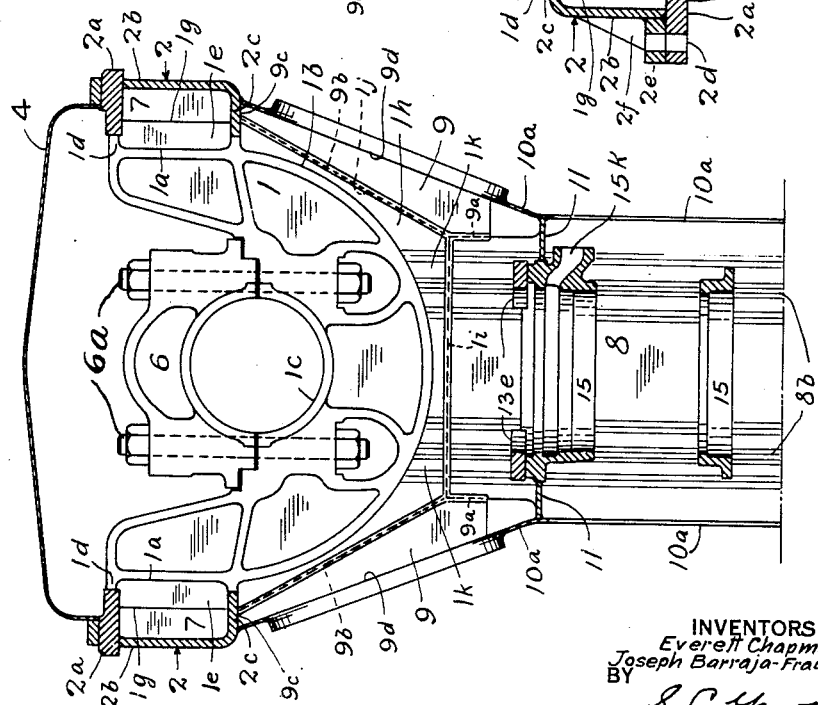
INVENTORS
Everett Chapman
Joseph Barraja-Frauenfelder
BY
S. C. Yeaton
ATTORNEY

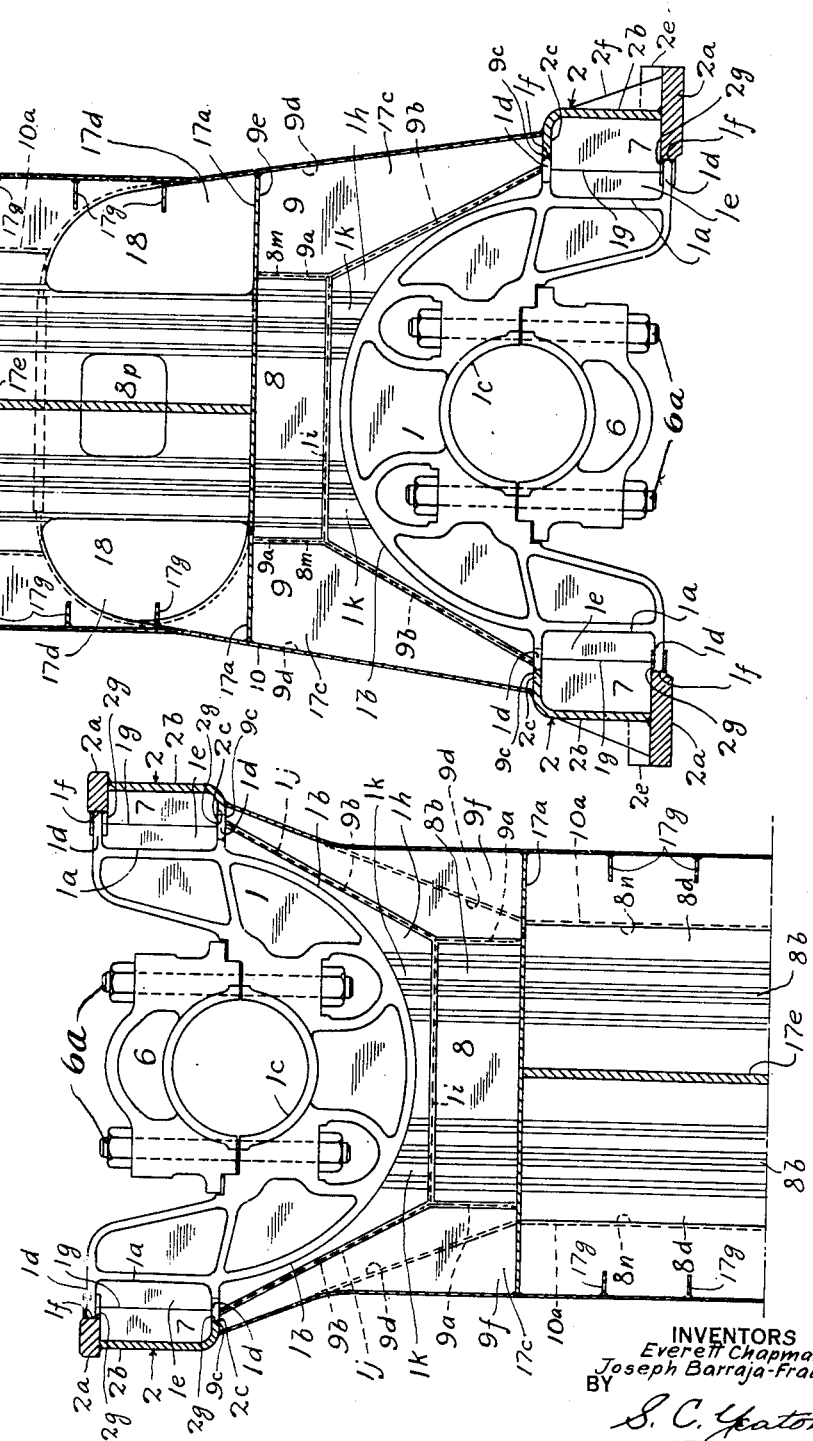

Nov. 1, 1949　　　E. CHAPMAN ET AL　　　2,486,927
ENGINE FRAME CONSTRUCTION
Filed Jan. 6, 1945　　　14 Sheets-Sheet 9
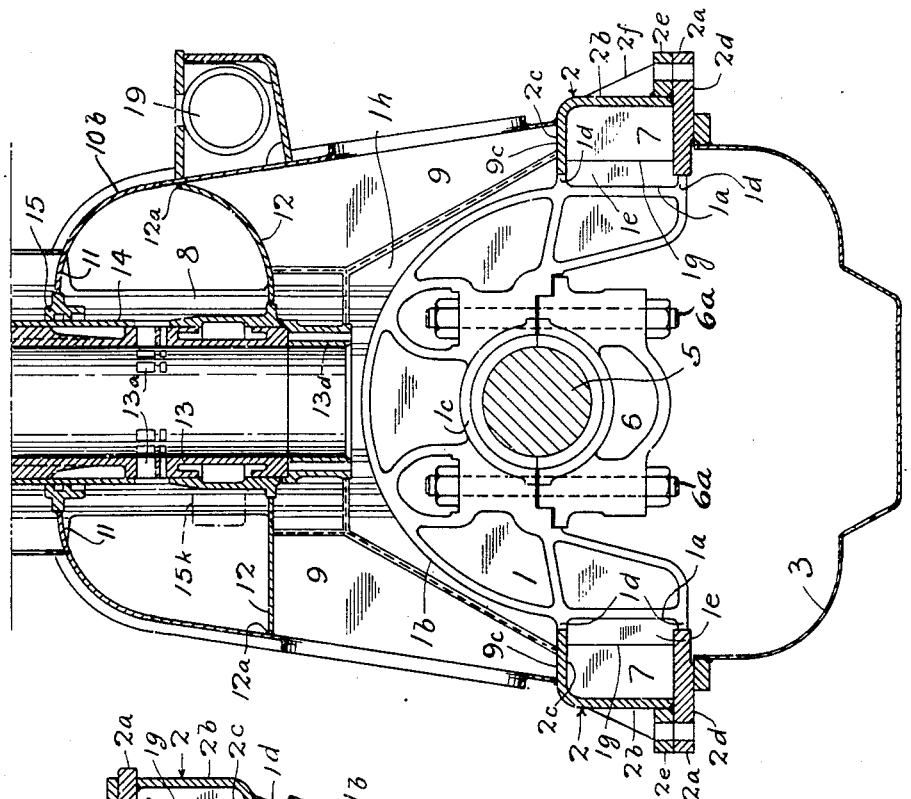
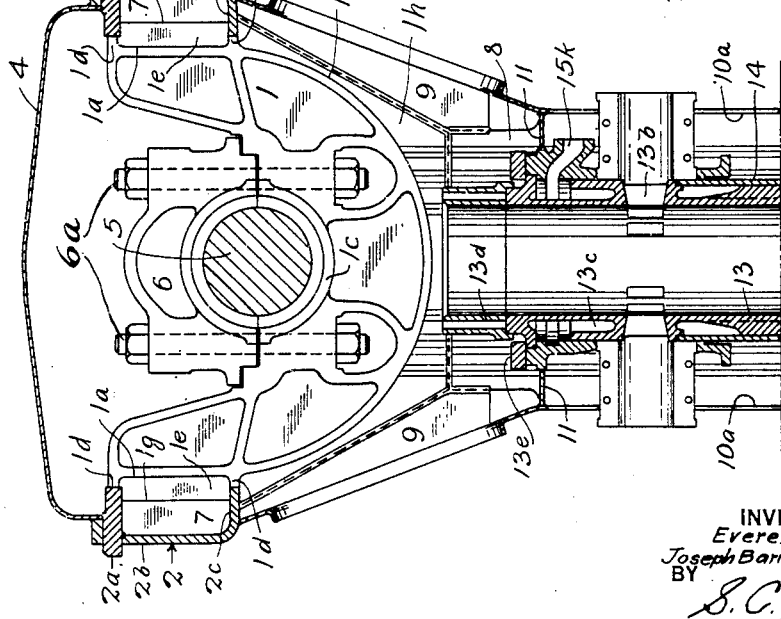
INVENTORS
*Everett Chapman*
*Joseph Barraja-Frauenfelder*
BY
ATTORNEY

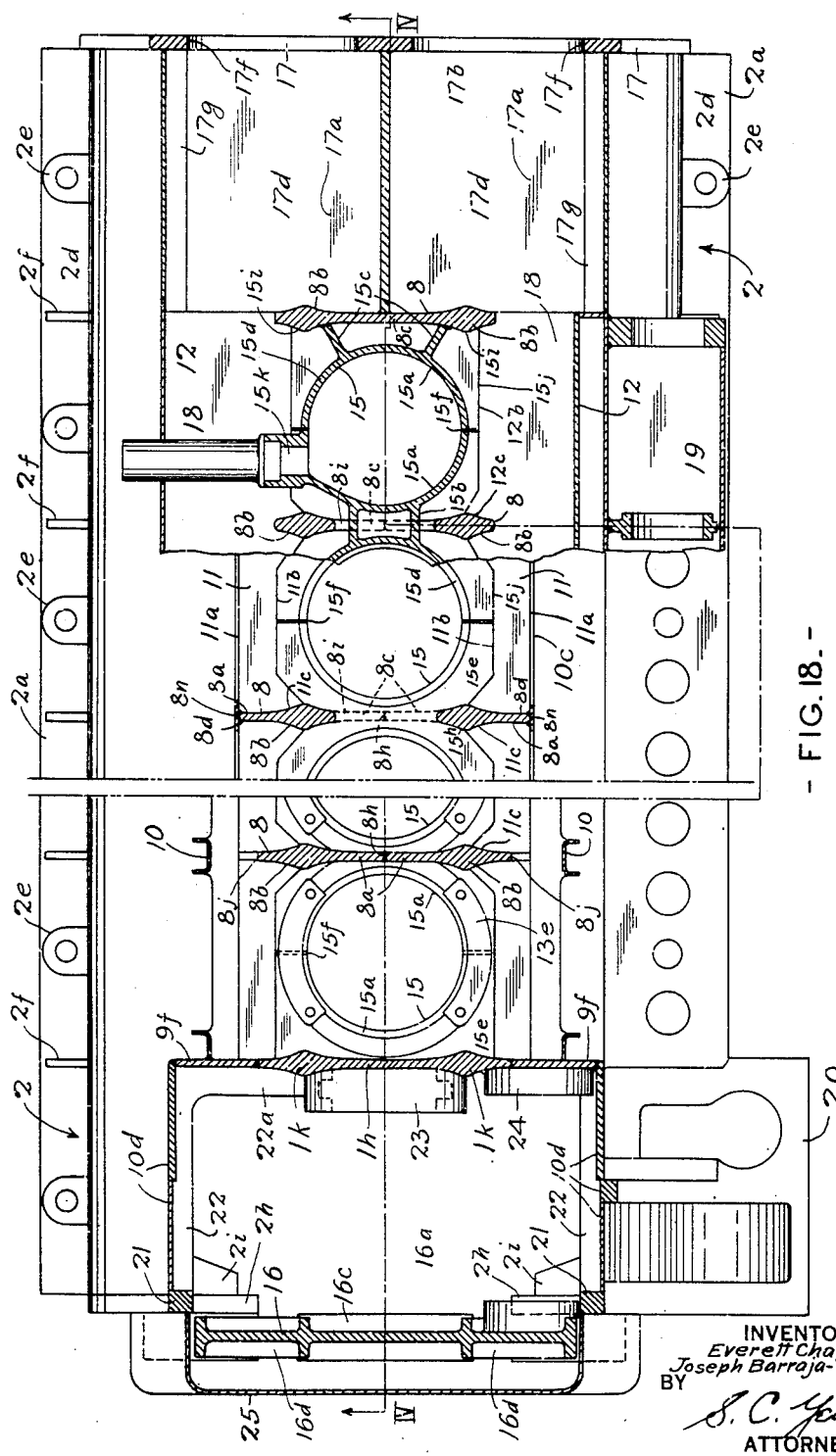

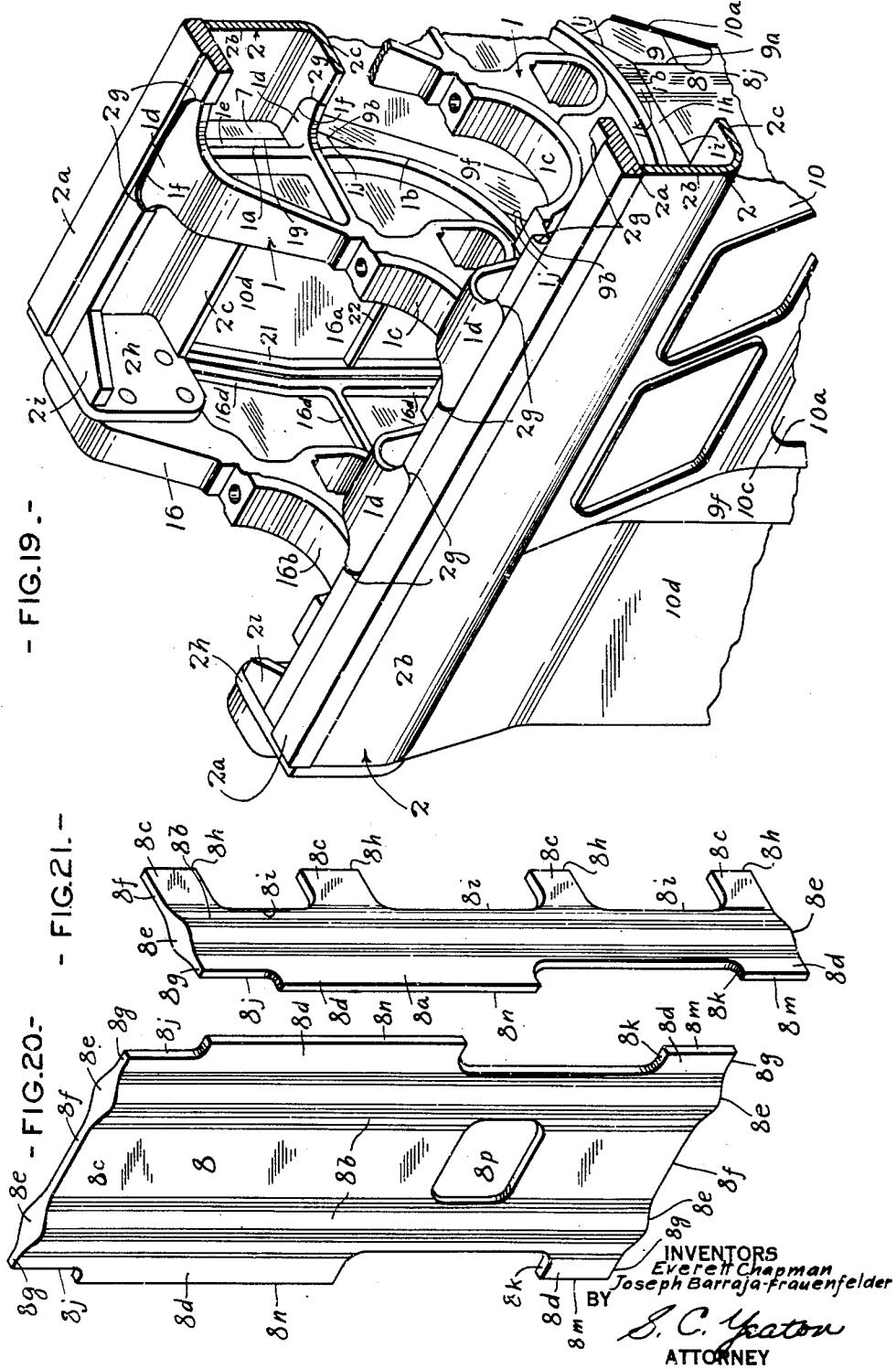

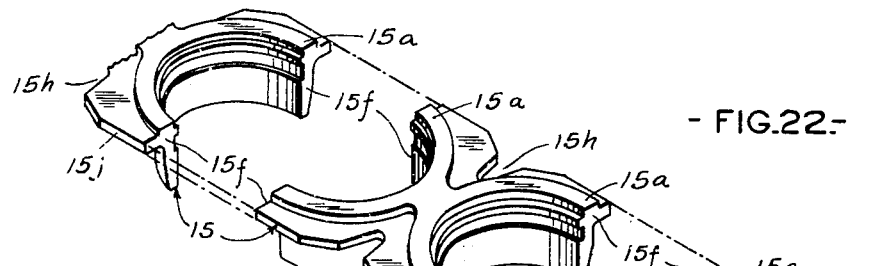
- FIG.22.-
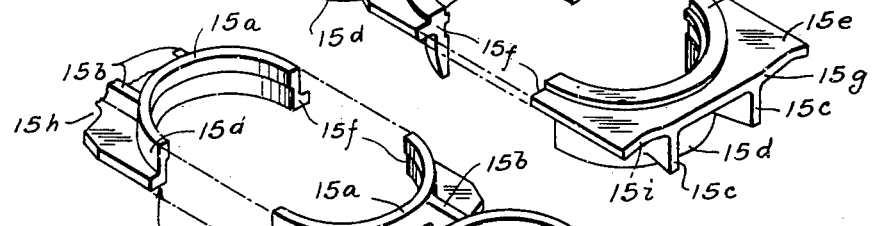
- FIG.23.-
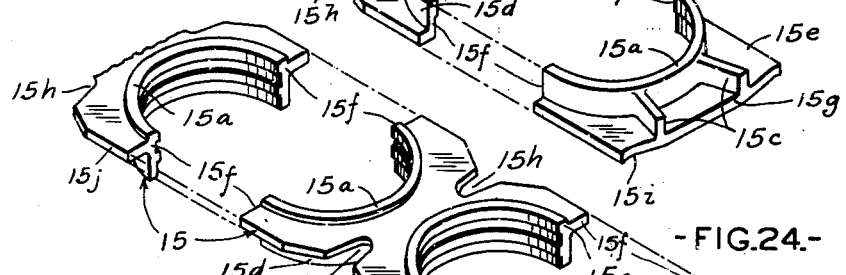
- FIG.24.-
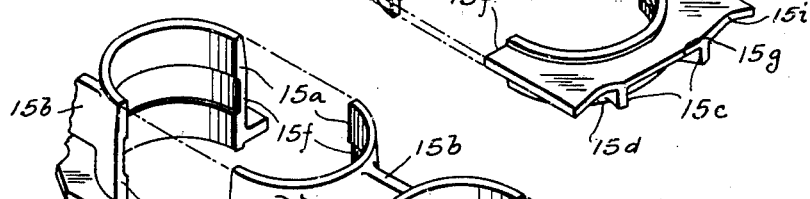
- FIG.25.-
INVENTORS
Everett Chapman
Joseph Barraja-Frauenfelder
BY
S. C. Yeaton
ATTORNEY

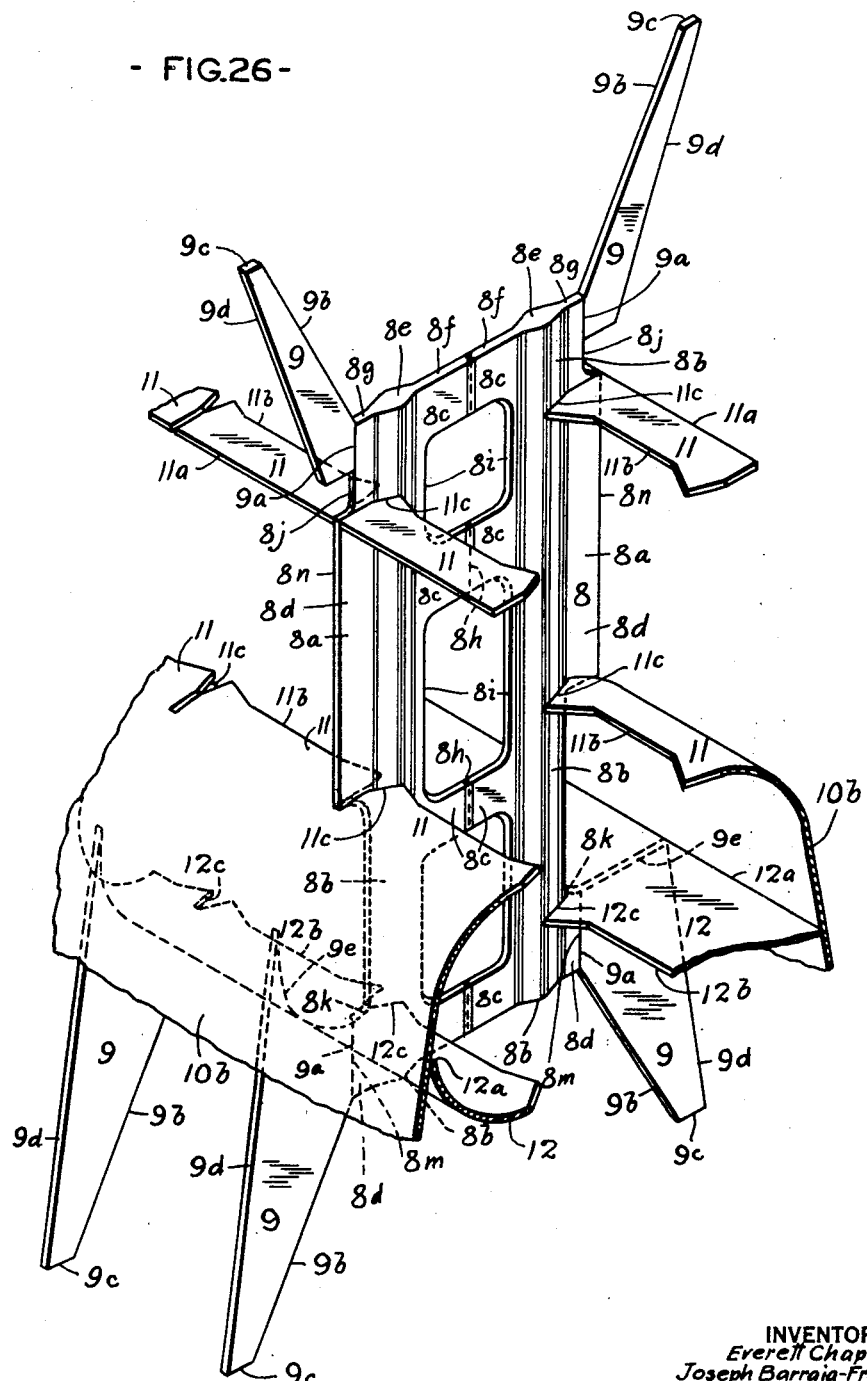

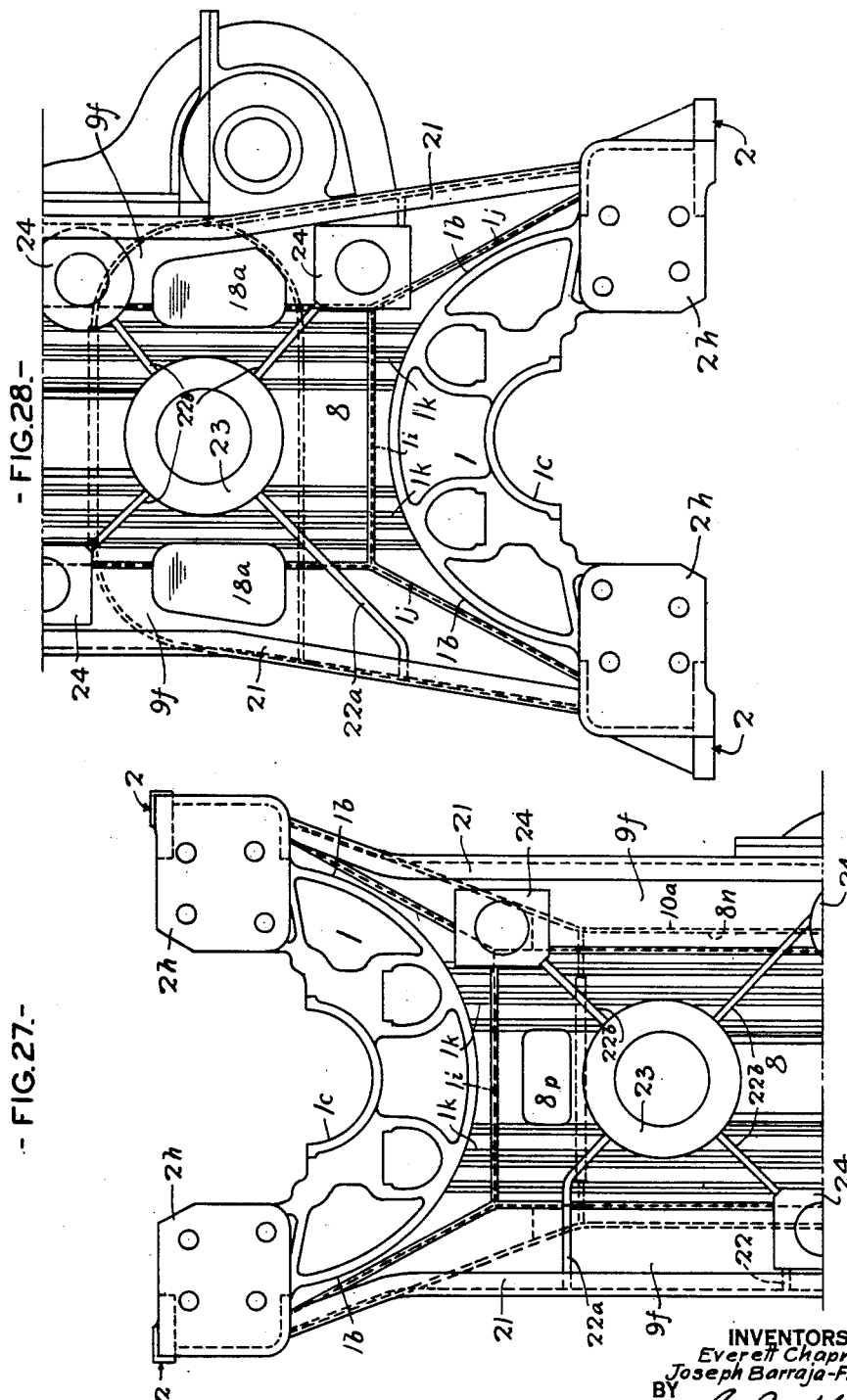

Patented Nov. 1, 1949

2,486,927

UNITED STATES PATENT OFFICE 2,486,927

ENGINE FRAME CONSTRUCTION

Everett Chapman, West Chester, Pa., and Joseph Barraja-Frauenfelder, Schenectady, N. Y., assignors to American Locomotive Company, New York, N. Y., a corporation of New York Application January 6, 1945, Serial No. 571,626

22 Claims. (Cl. 121—194)

This invention relates to an engine frame construction.

The invention more particularly relates to a built-up reciprocating engine frame construction comprised mainly of various separate parts welded together to form a rigid unitary structure.

An object of the present invention is to provide, in a multicylinder engine frame construction of the aforementioned characteristics having cylinder liner supporting collars arranged in spaced longitudinal rows, plate-like members welded to the collars for supporting the rows of collars in spaced relation, the members further serving as tension members taking the place of the usual tie bolts.

A further object is to provide, in place of the bolts usually employed to tie the top part of the engine to the bottom part for taking the tension forces imposed upon them during the working of the engine, transverse plate-like members welded at their ends to top and bottom engine parts, constructed not only to serve as tension members in place of the bolts, but also to serve as compression members for supporting the weight of various of the engine parts, some of which are welded to the members.

A further object is to provide, in a construction as aforementioned, strengthening plate-like parts associated with and welded to the plate-like members and being, with the members, welded to the engine cover.

A further object is to provide, for an opposed piston type of engine, a frame construction of the aforementioned characteristics, wherein the plate-like members are welded at their ends to the respective crank shaft bearing supports, for resisting tension-producing forces transmitted thereto from these supports.

A further object, in a frame construction having the longitudinal rows of liner collars as aforementioned, is to form each row of separate parts welded together.

A further object, in a built-up engine frame construction, is to provide sufficient free space adjacent the jointure of various of the parts to be welded to permit continuous welds at the joints to be effected.

A further object is to provide, in a built-up engine frame construction, liner collar supporting plate-like members of one-piece or of built-up welded construction having bar-like portions extending axially of the cylinders.

A further object is to provide a plate-like member whose cross section is distorted so that its major tension resisting areas come into the line of action of the tension loads produced by gas loads of the engine.

A further object is to provide plate-like members so shaped as to have bar-like portions as aforesaid whereby the weight of the members will be less than the weight of mere plates of equal strength for the purposes intended.

A further object is to provide, in a built-up engine frame construction, a gear compartment at one end of the frame constructed to serve as a stiffening member strengthening the frame against racking.

A further object is to provide, in a built-up engine frame construction, a cylinder air supply inlet compartment at one end of the frame constructed to serve also as a stiffening member strengthening the frame against racking.

A further object is to provide, in a frame construction having the longitudinal rows of liner collars as aforementioned, portions of the engine cover welded to the liner collars of a row and forming walls of the air ducts for the engine cylinders.

A further object, in a frame construction having the aforementioned strengthening plate-like parts, is to form some of these parts so that they support the engine camshaft housing.

Other and further objects of this invention will appear from the following description, the accompanying drawings and the appended claims.

It will be at once obvious that the present invention may be employed in various types of engines but it is especially adapted for multicylinder internal combustion engines and is shown in the drawings in connection with a vertical internal combustion engine of the two-cycle opposed piston type having eight cylinders. Therefore the following description will be confined to a frame construction for such an engine involving the present invention, brief mention being made of various other of the engine parts.

Figure 2:
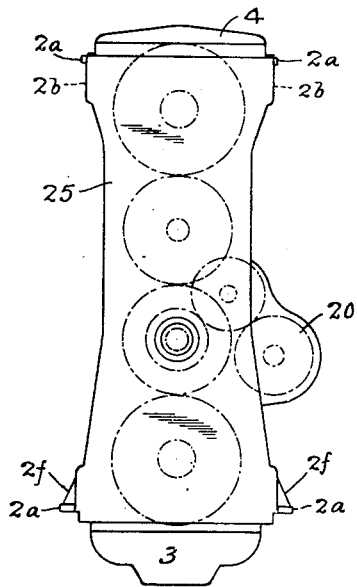
Figure 3:
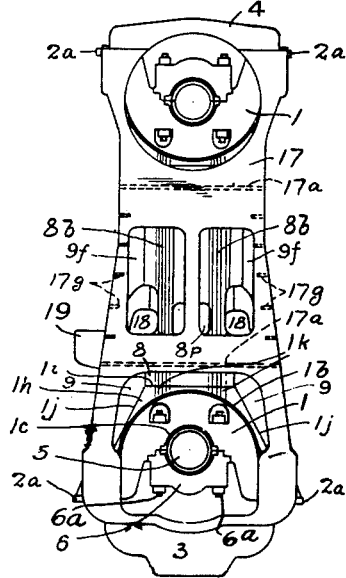

Referring to the drawings forming part of this application, Figures 1, 2 and 3 are, on a reduced scale, diagrammatic front, left and right end (as viewed from Fig. 1) views respectively of an engine embodying the present invention; Figs. 4 and 5 are foreshortened sectional views respectively of the upper and lower portions of the engine taken on the line IV—IV of Fig. 18, parts being omitted; Figs. 6 and 7 are end views respectively of the upper and lower portions of the engine viewed from the right of Fig. 1, parts being omitted; Figs. 8 and 9 are end views respectively of the upper and lower portions of the engine viewed from the left of Fig. 1, parts being omitted; Fig. 10 is a section on the line X—X of Fig. 4, parts being added and other parts being omitted; Fig. 11 is a section on the line XI—XI of Fig. 5, parts being added and other parts being omitted; Fig. 12 is a section on the line XII—XII of Fig. 4, parts being added; Fig. 13 is a section on the line XIII—XIII of Fig. 5, parts being added; Fig. 14 is a section on the line XIV—XIV of Fig. 4, parts being added and other parts being omitted; Fig. 15 is a section on the line XV—XV of Fig. 5, parts being added and other parts being omitted; Fig. 16 is a section on the line XVI—XVI of Fig. 4, parts being added; Fig. 17 is a section on the line XVII—XVII of Fig. 5, parts being added; Fig. 18, at the left, is a section on the line XVIII—XVIII of Fig. 4, and at the right, a section on the line XVIIIa—XVIIIa of Fig. 5; Fig. 19 is a fragmentary isometric view of a top portion of the engine frame; Fig. 20 is an isometric view of a plate-like member of the engine; Fig. 21 is an isometric view of an element of another plate-like member of the engine; Figs. 22 to 25 are each an isometric view of a fragmentary row of cylinder collar parts spread apart; Fig. 26 is a fragmentary isometric view of a plate-like member of the engine with associated parts; Fig. 27 is a section on the line XXVII—XXVII of Fig. 4, parts being omitted; and Fig. 28 is a section on the line XXVIII—XXVIII of Fig. 5, parts being omitted.

Only sufficient of the engine is shown to provide a full understanding of the present invention.

Referring more particularly to the engine frame, there is a bottom longitudinal row of nine spaced transverse crankshaft bearing supports below, and a similar but inverted top row above, the engine cylinders. These supports are each indicated generally by the reference numeral 1, and as they are similar, a description of one will suffice. The sides of the supports of each row are connected by two tie girders 2. The bottom supports and girders form the base of the engine and carry the weight of the engine. The bottom girders carry the oil sump 3, and the top girders carry the oil hood 4.

The crankshaft bearing support 1 is arch shaped, comprising two legs, each having a vertical face 1a, a portion connecting the legs having an arcuate face 1b, and a crankshaft half bearing 1c midway between the legs. Each leg has two tongues 1d curved at their ends and extending laterally from the opposite ends of the face 1a, and a web 1e extending laterally from the face 1a and connecting the two tongues 1d midway thereof. The curved edges 1f of the tongues 1d extend beyond the edge 1g of the web 1e. The arcuate face 1b has projecting therefrom a web 1h having a horizontal edge 1i and at each end thereof an inclined edge 1j extending to the adjacent tongue 1d. The web 1h has at each side of its center and equally spaced therefrom a vertical bar-like portion 1k integral at one end with the face 1b and having its opposite end 1m flush with the horizontal edge 1i.

A crankshaft 5 is retained in the half bearings 1c of each row of crankshaft bearing supports 1 by caps 6 secured thereto by vertical bolts 6a and the crankshaft bearing supports are spaced to dispose one on each side of each crank of the crankshaft.

The bottom tie girders 2 are similar and the top tie girders 2 are similar and substantially like the bottom tie girders but are inverted, the tie girders being constructed to provide channels. They comprise a relatively heavy horizontal plate 2a and an angle iron having a vertical leg 2b welded to the plate 2a between its longitudinal edges, forming the web of the channel, and a horizontal leg 2c spaced from the plate and directed inwardly forming one of the flanges and the portion of the plate extending inwardly from the leg 2b forming the other of the flanges of the channel. The plates of the bottom tie girders extend for a substantial distance outwardly from the legs 2b providing a bolting flange 2d for bolting the engine to a bed. To this end bolting lugs 2e are welded to the bolting flange 2d and to the leg 2b and between these lugs stiffening gussets 2f are provided welded to the flange 2d and to the leg 2b.

The leg 2c and plate 2a at their inner edges are provided with grooves having defining edges 2g complementary to the curved edges 1f. There is thus a groove for each tongue and the tongues fit in these grooves and are welded therein at both sides of the joint between the groove and tongue.

It has been stated as to each leg of the bearing supports 1 that the edges 1f of the tongues 1d extend beyond the edge 1g of the web 1e. This is to provide a clear way for effecting a continuous weld around the joint from end to end thereof between the edges 1f and 2g at the side of the joint within the channel of the girder 2. After this welding has been accomplished, strengthening plates 7 are disposed in the channel filling the space between each channel leg 2b and the adjacent web 1e, they being welded therein.

From the foregoing it will be seen that the bearing supports 1 are rigidly connected to withstand all service conditions.

A portion of the engine frame construction at top and bottom has now been described comprising associated parts constructed to provide for a welded joint therebetween forming part of the present invention. A further portion of the engine frame construction will now be described.

In an eight cylinder engine there are nine tension-resisting and supporting vertical plate-like members 8 disposed transversely of the engine, one for each crankshaft bearing support 1, four vertical strengthening plates 9, two at the top and two at the bottom, for each inner member 8, supporting the multipart cover 10 of the engine, two longitudinal rows of horizontal strengthening and cover-supporting plates 11, one above the other, on each side of the engine, and a bottom strengthening and cover-supporting plate 12 at each side of the engine extending longitudinally thereof and spanning the members 8. The right end member 8 has the lower supporting plates 9 but other supporting plates are substituted for the upper supporting plates 9, and the left end member 8 has supporting plates taking the place of the four supporting plates 9, all as will later more fully appear.

The cover 10 has an upper part 10a and a lower part 10b welded thereto on each side of the engine, spanning the nine members 8. The upper margins of the lower parts are each curved inwardly. The aforesaid plates 11 of the upper rows are made separate whereas the aforesaid plates 11 of the lower rows are formed integral with the curved upper margins of the cover lower parts 10b adjacent thereto.

Each of the inner members 8 is similar and the end members 8 are substantially similar to each other but differ somewhat from the inner members 8. The inner member 8 comprises two similar parts or elements 8a, one at each side of the longitudinal vertical central plane of the cylinders and facing each other. A description of one of these elements 8a will suffice.

The element 8a is plate-like and comprises a vertical tie-rod or bar-like portion 8b, a web 8c extending from the inner side of the portion 8b laterally inward and a web 8d extending from the outer side of the portion 8b laterally outward. The bar-like portion 8b protrudes from and blends into the opposite faces of the webs giving the bar-like portion more or less of an oval shape in cross section. The ends 8e of the bar-like portion and the ends 8f and 8g of the webs 8c and 8d respectively are flush providing ends for the element.

The inner web 8c has an inner edge 8h with three recesses 8i extending substantially to the bar-like portion 8b. The outer web 8d has an upper shoulder providing a vertical edge 8j and a recess providing a lower horizontal edge 8k, thus providing of the outer edge of the web 8d a lower edge 8m and an edge 8n between the shoulder and recess, this edge 8n being welded to the cover upper part 10a.

The plate-like member 8 is disposed between opposite upper and lower webs 1h. The opposed edges 8h of the elements 8a are welded together at the vertical longitudinal center plane of the cylinders, the opposed recesses 8i forming upper, lower and intermediate windows.

The ends 8e of the bar-like portions 8b and the ends 8f and 8g of the webs 8c and 8d respectively of each inner member 8 are adjacent the corresponding ends 1m of the bar-like portions 1k and the edge 1i of the web 1h of the correlated crankshaft bearing support 1 and are welded thereto at the joints therebetween. The plate-like end members 8 are substantially like the inner members 8 and like parts are indicated by like references. They may be made in two parts but preferably, as shown, they are made in one piece and they have no window-providing recesses as these are not needed because assembly considerations do not apply at these ends. The end member 8 (Fig. 20) at the right end of the engine, as viewed in Fig. 1, has an opening 8p near its bottom and the left end member has an opening 8p (Fig. 27) near its top, facilitating welding. These openings 8p will be covered by welded-on cover plates in the finished engine. The left end member 8 further differs from the right end member 8 by being somewhat narrower, by not having the top corner recesses, and by having the edge 8n extending further down (Fig. 7). The end members 8 are arranged and welded to their associated upper and lower crankshaft bearing supports 1 and are welded to the engine cover 10 similar to the inner members 8.

Thus the transverse members 8 are supported on their lower crankhsaft bearing supports 1 and support their upper crankshaft bearing supports 1 and parts associated therewith. They tie these upper and lower supports 1 together and resist tension-producing forces transmitted thereto from these supports 1, adding great rigidity to the frame construction.

It is usual practice to connect the aligned pairs of crankshaft bearing supports of an opposed piston engine by tie bolts, these bolts being subjected to tension-producing forces because the old cast iron construction involved a material intrinsically weak in tension and which, therefore, had to have its tension deficiencies implemented by steel tie rods. In the welded frame construction of the present invention the plate-like members 8 are employed, their bar-like portions taking the place of the usual tie bolts, and through their welded end connections resist tension-producing forces transmitted thereto. Various parts are welded to these bar-like portions which could not be successfully done in the case of the conventional tie bolts, the outer and inner webs of the members 8 affording added strength to the bar-like portions, and the bar-like portions in turn stiffen the outer webs adding to their better support of the various parts welded thereto. The bar-like portions serve as supporting members as well as tension members. In short, the plate-like members 8 serve both as supporting means and tension-resisting means.

By distributing the metal of the plate-like member to form the bar-like portions with the relatively thin webs each side thereof, a structure of greater strength is thus produced than would be the case if a mere plate of uniform thickness and of the same weight were employed. The plate-like member 8 is a tension-resisting member whose cross section is distorted so that its major tension-resisting areas (bar-like portions) come into the line of action of the tension loads produced by gas loads of the engine. That is to say, the bar-like portions are in line with the bolts connecting the caps 6 to the crankshaft bearing supports.

The cover-supporting plates 9 at each corner of the member 8 have each a vertical edge 9a. The edge 9a of each top plate 9 is welded to its opposed member edge 8j, and the edge 9a of each bottom plate 9 is welded to its opposed member edge 8m. Each plate 9 further has an inclined edge 9b welded to its opposed bearing support web edge 1j, a horizontal edge 9c welded to the opposed girder leg 2c and an inclined edge 9d welded to the cover 10 for support thereof. The bottom plates 9 have each a top edge 9e flush at one corner with the member recess edge 8k. Edges 9e of the plates at the front of the engine (Fig. 1) are curved upwardly from the edges 8k but the edges 9e of the plates at the rear of the engine are horizontal, see for example Fig. 26. The top plates 9 are smaller than the bottom plates 9.

The two plates 12 are similar except that the front plate 12 curves upwardly for purposes presently to appear. The rear horizontal plate 12 is supported upon and welded to the edges 9e and 8k. It has an outer edge 12a welded to the cover part 10b for support thereof. Its inner edge is provided with spaced projections having inclined edges which, together with the intercepted portions of the inner edge, provide successive recessed three-sided edges 12b. The projections are provided with V-shaped grooves 12c and the outer parts of the bar-like portions 8b fit into and are welded to these grooves 12c. The front plate 12 is similar except that its outer edge 12a is welded to the cover part 10b at a point spaced above the edge 8k and is curved.

The plates 11 of the top row are disposed each between an adjacent pair of members 8 and are welded, at their opposite ends thereto at the upper end of the edges 8n. The curved plates 11 of the lower row are similarly disposed and welded to the adjacent members 8 adjacent the lower ends of the edges 8n. Each row of top plates 11 is, in effect, similar to the rear plate 12 but nartower, the upper rows each providing an outer edge 11a welded to the engine cover part 10a adjacent thereto for support thereof, a recessed inner edge 11b, and grooves 11c into which fit and are welded thereto the outer parts of the bar-like portions 8b. The rows of bottom plates 11 also have the edges 11b and grooves 11c.

The plates 9, 11 and 12 besides affording support for the cover 10 stiffen the frame construction and present added features of the present invention.

The frame construction further includes collars for the cylinder liners 13 (Figs. 16 and 17). The collars per se present another feature of the present invention and while they may be employed in other designs of engine frame constructions and likewise while the frame construction as thus far described may employ other designs of collars and other designs of cylinders, the collars are nevertheless especially appropriate for the present frame construction and will be described in connection therewith.

The collars are arranged in four horizontal vertically spaced rows of eight collars each so that there are four vertically spaced collars for each liner 13. The collars are cylindrical interiorly and fit about their respective liners 13. More precisely, in the present instance the collars of the two intermediate rows fit about the jackets 14 provided for the liners 13. The collars are made in segmental sections. Preferably each collar is made of two segmental half sections.

The collars are indicated by the reference numeral 15 and the sections by 15a. The collars of the upper row are deeper than the collars of the two intermediate rows and the collars of the bottom row are deeper than the collars of the three rows thereabove. Each row of collars is made of a plurality of separate parts and the row of collars is preferably built up by welding before the row is assembled with the associated parts of the frame.

The adjacent collars of each row have their adjacent parts formed integral, that is to say, the two adjacent half sections 15a of adjacent collars are formed integral back to back providing a separate unit in each case. In the present eight cylinder engine there are seven such units for each row, and two separate end units, each of only a single half section (Figs. 22 to 25). The two half sections forming the inner units are provided with integral parallel connecting bars 15b. The single sections forming the end units are provided with integral radial bars 15c.

All the sections have the common feature of being provided with an exterior semi-cylindrical face 15d, the bars 15b and 15c projecting from their respective adjacent faces 15d. Each of the sections has a further common feature, namely an integral flange 15e projecting laterally from its respective cylindrical face 15d, the flanges 15e of the integral sections being formed integral.

The terminating edges 15f of the two half sections of each collar, including the terminating edges of the two flanges, are in a diametral plane transverse of the engine and are connected together at these edges by welding, which is preferably a type of welding such as flash welding where metal at the joint will be displaced to the necessary extent to insure accurate predetermined spacing of the axes of the collars, i. e., the axes of the cylinders. The pressing may be effected by hydraulic cylinders having a controlled stroke. This provides continuity of the flanges from end to end of the row. The edges 15g of the flanges 15e of the end section are flush with the outer ends of their respective bars 15c.

There is a cylinder between and supported by a pair of adjacent members 8. Therefore there is a vertical row of four collars centrally disposed between a pair of these members 8, the end members 8 abutting and being welded to the flange outer edges 15g and the outer edges of the bars 15c. The integral flanges 15e are at their centers in the windows of the inner members 8. At these centers these flanges are provided at their outer edges with grooves 15h. The grooves fit about the inner parts of the bar-like portions 8b and are welded thereto at both the upper and lower sides of the flanges. The end flanges 15e at their end edges have grooves 15i which fit about and are welded at both sides to the bar-like portions 8b of the end members 8.

The collars 15 of the uppermost row, the lower of the intermediate rows and the lowermost row have the outer edges 15j of their flanges between the grooves 15h opposite, complementary and welded respectively to the correlated edges 11b of the uppermost and intermediate rows of plates 11 and the edges 12b of the plates 12.

The flanges 15e of the upper of the two intermediate rows of collars 15 are opposite openings 10c in the cover part 10a, and therefore no plates corresponding to the plates 11 are provided for these flanges. The openings 10c are disposed between pairs of members 8 and between pairs of plates 11 of the two rows.

The windows aforementioned which are provided in the inner members 8 and which are formed by the opposed recesses 8i of the elements 8a of these members are of different heights. Thus they are suitable to accommodate, as to the upper windows the upper crossing row of collars at their integral junctures, as to the intermediate windows the two intermediate crossing rows of collars at their integral junctures, and as to the lowermost windows the lowermost crossing of collars at their integral junctures.

The upper and lower edges of the windows are amply spaced from their correlated respective integral junctures of the adjacent collars, and the exterior faces 15d of the collars at these junctures amply recede outwardly away from the grooves 15h providing sufficient flange surface adjacent the grooves to provide sufficient room for the application of suitable welding apparatus to make the aforesaid welds welding the bar-like portions 8b to the flanges 15e, taking into consideration the ample spacing of the rows of collars which is provided for. It will be seen that the collars 15 are supported by the members 8. The longitudinal unitary rows of collars arranged and welded to their associated parts as has been described further add to the rigidity of the frame construction.

A casting 16 is disposed at the left hand end of the frame (Fig. 19) providing a compartment 16a for gears (Fig. 2) between the casting and the left end member 8 (Figs. 4, 5 and 18). The top and bottom portions of the casting form two other crankshaft bearing supports 16b provided with caps 6. The adjacent or left end member 8 and its supports 1 provide a portion of an inner wall for this compartment 16a, the remainder of the wall being formed by vertical transverse plates 9f. Each of these plates 9f is disposed in the plane of the left end member 8 and fills the space between and is welded to the adjacent edges 14, 8n and 8m, the legs 2c and the cover 10 (Figs. 27 and 28), and has a recess in line with the adjacent recess of the left end member 8 below its edge 8n. Thus plates 9f take the place of plates 9 for the left end member 8. The cover parts 10a and 10b and the plates 11 and 12 abut the plates 9f on the inner faces thereof and are welded thereto.

The tie girders 2 extend beyond the left end member 8 and each tie girder has welded to its left end a bolting plate 2h, to which plates 2h the end casting 16 is bolted. The plates 2h are each reinforced by a triangular plate 2i welded thereto and to the adjacent girder heavy plate 2a (Fig. 19). Each top and bottom girder on the same side of the engine is connected at the left ends thereof by a vertical bar 21, square in cross section and welded at its top and bottom respectively to the top and bottom girders and to the plates 2h, the plates 2h forming extensions of the bars 21.

The cover plate 10 further includes a portion 10d on each side of the engine covering the sides of the compartment 16a. Portions 10d are formed of a plurality of parts, as is clearly shown in Fig. 18, of different thicknesses, the front portion 10d being cut out to fit around parts protruding from the front of the engine. The various parts of the portions 10d are welded together and to adjacent structure, including the bars 21 and the adjacent plates 9f, thereby adding to the rigidity of the frame.

The four side walls of the compartment 16a, that is to say, the portions 10d, plates 9f, the left end member 8 with its supports 1, and the casting 16, form a box which materially reinforces the frame and prevents racking during running of the engine, thereby preventing twisting and warping of the engine frame.

The box formed by the walls of compartment 16a is also reinforced internally. There are three horizontal ribs 22 crossing each wall portion 10d, two in the upper half and one in the lower half of the frame (Figs. 4 and 5) and each of these ribs is welded along its outer edge to the adjacent wall portion 10d, at its left end to the adjacent bar 21 and at its right end to the adjacent plate 9f. The top rib 22 on the rear of the frame further has a right angular extension 22a extending for a way horizontally across the adjacent plate 9f and the left end member 8 and then inclining downwardly to a top gear support 23 welded to the left end member 8, all as is clearly shown in Fig. 27, and the corresponding bottom rib 22 has a substantially similar extension 22a inclining upwardly for a bottom gear support 23. Various bosses 24 for fittings are also welded to the left end member 8 and associated parts and the gear supports 23 are further supported by ribs 22b extending to these bosses and welded thereto and to the adjacent parts of the frame. The casting 16 has bosses 16c aligned with supports 23 and has many integral strengthening webs 16d both on its inner side and outer side. The casting 16 is covered by a vertical hood 25.

At the opposite (right) end of the engine and spaced from the adjacent right end member 8 is a supporting plate-like wall 17 for supporting therebeyond auxiliaries of the engine (not shown) as for instance a turbocharger. The upper and lower tie girders 2 extend to the supporting wall 17 and are welded thereto. Two horizontal spaced plates 17a, the top plate being in line with the bottom of the top plates 9, and the bottom plate being in line with the horizontal edges 9e of the rear bottom plates 9, are welded to the supporting wall 17, the right end member 8, and front and rear extension portions 10e of the sides of the cover 10 providing a central chamber 17b and top and bottom chambers 17c. The bottom plate 17a is further welded to the bottom plates 9. There are plates 9f in line with the right end member 8 similar to the left end plates 9f but extending only to the curved top margins of the cover parts 10b. These plates 9f also form parts of the walls of chamber 17b and top chamber 17c, the top plate 17a being welded thereto. Central chamber 17b is partitioned on the longitudinal center of the engine by a wall 17e forming two ducts 17d for guiding scavenging and charging air from the turbocharger in two streams lengthwise of the engine at opposite sides thereof through spaces 18 adjacent the front and rear sides of the cover 10. The spaces act as air manifolds and are defined by the curved parts of the cover portions 10b, the plates 12 and the adjacent plates 11. The spaces 18 are closed adjacent the gear compartment by cover plates 18a over the adjacent recesses of the left end member 8 and plate 9f, and by adjacent parts of the left end plates 9f and left end member 8. The air enters the liners 13 through ports 13a and the exhaust leaves the liners through the ports 13b (Figs. 16 and 17).

Wall 17 is provided with two large air inlet openings 17f and cover portions 10e are strengthened by horizontal ribs 17g. Walls 17 and 17e are relatively thick, effecting, with the ribs 17g, considerable strengthening of the right end of the frame. Wall 17e is provided with openings 17h affording communication between the ducts 17d.

On the front side of the cover 10 is welded a housing 19 for a fuel pump camshaft (not shown) and a housing 20 for the camshaft gear (Fig. 2), housing 20 being at the front of the gear compartment 16a. The fuel injector ports for the liner 13 are not shown. Housing 19 is partly supported by the top portions of the edges 9d of the adjacent plates 9, these plates extending to the top of housing 19. The front plate 12 and the adjacent portion of the cover part 10b both being curved, the passage 18 formed thereby for the air for the cylinders is bag-like and is thus better able to withstand the air pressure, thus preventing any undue deflection of the portion of the cover supporting the camshaft housing 19, thereby insuring permanently correct alignment of the camshaft bearings.

The sump 3 and the hood 4 are welded to the lower and upper tie girders 2 respectively and extend throughout their length. The various openings provided in the engine parts are closed, where necessary, by cover plates (not shown).

The cylinders are provided with cooling water passages 13c (Figs. 16 and 17) and the upper and lower rows of collars 15 are provided with ports 15k communicating with the cooling water passage 13c. The ports of one row of collars serve as water inlets and are connected to a water supply (not shown), and the ports of the other row of collars serve as water outlets. These ports 15k are not shown in Figs. 22 to 25 in behalf of simplicity and for the further reason that the collars are adapted for other engines where it may not be desirable to place the ports therein.

The liners 13 are each provided at its top and bottom with removable portions 13d to facilitate the removal of the pistons (not shown) from their liners, these portions 13d being removable with the pistons, and the liners are held in the collars by retainers 13e secured to the top collars.

The welding of the various parts of the engine frame construction together will be performed in each instance by the most appropriate type of weld, as for instance groove welding, fillet welding, butt welding and so forth. The welding of the segmental sections of the cylinder collars together is preferably accomplished by flash welding.

While there has been hereinbefore described an approved embodiment of this invention, it will be understood that many and various changes in form, arrangement of parts and details of construction may be made thereto without departing from the spirit of the invention, and that all such changes and modifications as fall within the scope of the appended claims are contemplated as a part of this invention.

The invention claimed and desired to be secured by Letters Patent is:

1. In a multicylinder reciprocating engine welded frame construction, a plate-like element comprising a bar-like portion extending parallel to the axis of a cylinder and welded at its ends to frame parts for resisting tension-producing forces transmitted thereto; and a web integral with and extending laterally inwardly from said bar-like portion, said element being welded to cylinder parts for support thereof.

2. In a multicylinder reciprocating engine welded frame construction, a plate-like element comprising a bar-like portion extending parallel to the axis of a cylinder and welded at its ends to frame parts for resisting tension-producing forces transmitted thereto; and a web integral with and extending laterally inwardly from said bar-like portion, said bar-like portion protruding from the opposite faces of said web.

3. In a multicylinder reciprocating engine welded frame construction, a member comprising two spaced bar-like portions extending parallel to the axis of a cylinder and welded at their ends to frame parts for resisting tension-producing forces transmitted thereto; and a lateral web connecting said bar-like portions crossing a diametral plane of said cylinder, said bar-like portions blending into said web and welded to parts of said cylinder for support thereof.

4. In a multicylinder reciprocating engine welded frame construction, a plate-like member comprising two elements, each element including a bar-like portion extending parallel to the axis of a cylinder and a web integral with and extending laterally inwardly from its said bar-like portion, said bar-like portions being welded at their ends to frame parts for resisting tension-producing forces transmitted thereto, said webs being welded together at their inner edges, said member crossing a diametral plane of said cylinder with a bar-like portion at each side of said plane, each of said bar-like portions blending into its said web and welded to parts of said cylinder for support thereof.

5. In a multicylinder reciprocating engine welded frame construction, a plate-like element comprising a bar-like portion extending parallel to the axis of a cylinder and welded at its ends to frame parts for resisting tension-producing forces transmitted thereto; a web integral with and extending laterally inwardly from the inner side of said bar-like portion, said bar-like portion blending into said web and welded to cylinder parts for support thereof; and a web integral with and extending laterally outwardly from the outer side of said bar-like portion welded to the engine cover for support thereof.

6. In a welded frame construction for a multicylinder reciprocating engine having cylinder liners, a collar for each of two adjacent cylinder liners, said collars being connected together by a common flange having welding grooves at its opposite outer edges; and a plate-like member comprising two elements, each element including a bar-like portion extending parallel to the axes of said collars, and a web integral with an extending laterally inwardly from the inner side of its said bar-like portion, its said bar-like portion blending into its said web, said member crossing the center plane of said collars with said bar-like portions each fitting in and welded to the margin of said groove adjacent thereto for support of said collars, said webs being welded together at their inner edges and recessed at said flange to permit said crossing.

7. In a welded frame construction for a multicylinder reciprocating engine having cylinder liners, a collar for each of two adjacent cylinder liners, said collars being connected together by a common flange having a welding groove at an outer edge thereof; and a plate-like element disposed at the groove side of said collars comprising a bar-like portion extending parallel to the axes of said collars and a web integral with an extending laterally inwardly from said bar-like portion, said bar-like portion blending into said web, fitting in said groove and welded to the margin of said groove at one side thereof for support of said collars, said web having a recess at said flange extending to said bar-like portion and spacing said web from said flange at its said side to facilitate application of weld metal around said margin.

8. In a multicylinder reciprocating engine welded frame construction, a plate-like element; a cylinder collar; a crankshaft bearing support at the lower end of said element; and a frame part at the upper end of said element, said element comprising a bar-like portion and a web integral with and extending laterally inwardly from the inner side of said bar-like portion, said bar-like portion blending into said web, said bar-like portion extending parallel to the axis of said collar and welded thereto for support thereof and welded at its lower end to said bearing support and at its upper end to said frame part for support of said element and for resisting tension-producing forces transmitted to said bar-like portion.

9. In a multicylinder opposed piston engine welded frame construction, a transverse plate-like element extending parallel to the axis of a cylinder and welded at its opposite ends to frame parts for resisting tension-producing forces transmitted thereto, and welded intermediate its ends to cylinder parts for support thereof; an engine cover, said element being welded along a portion of its outer edge to said engine cover; cover-supporting plates welded to the outer corners of said element and extending laterally and axially therebeyond, welded at their inner edges to frame parts and welded at their outer edges to said cover; a transverse plate-like element at one side of and spaced from said first mentioned element; and transverse axially spaced members spanning said elements and welded thereto and welded at their outer edges to said cover.

10. In a multicylinder reciprocating engine welded frame construction, a plate-like element having a bar-like portion extending parallel to the axis of a cylinder, a web integral with an extending laterally inwardly from the inner side of said bar-like portion and welded to cylinder parts for support thereof, and a web integral with an extending laterally outwardly from the outer side of said bar-like portion; an engine cover, said last mentioned web being welded to said engine cover for support thereof; and a crankshaft bearing support having at its axially inner side a bar-like portion provided with integral lateral webs, at the inner and outer sides thereof, said element at one end thereof having its said bar-like portion and webs respectively adjacent to, in alignment with, and welded to said bearing support bar-like portion and webs, and said element bar-like portion and webs being welded at their opposite ends to a frame part whereby said element is supported and resists tension-producing forces transmitted thereto.

11. In a welded frame construction for a multicylinder engine having cylinder liners, a collar for each of two adjacent cylinder liners, said collars having a lateral common flange integral therewith and each of said collars having an exterior face extending axially from one side of said flange at the inner edge thereof, said flange at an outer edge thereof having a groove disposed between said faces; and a plate-like element disposed at the groove side of said collars comprising a bar-like portion extending parallel to the axes of said collars and a web integral with and extending laterally inwardly from said bar-like portion, said bar-like portion fitting in said groove and welded to the margin of said groove at the collar face side thereof for support of said collars, said web having a recess at said flange extending to said bar-like portion, said web being spaced by said recess from said flange at its said side and said collar faces being spaced from said groove at its said side to facilitate application of weld around said groove margin.

12. In an opposed piston multicylinder engine welded frame construction, a plate-like element; a cylinder collar; a crankshaft bearing support at each of the opposite ends of said element, said element extending parallel to the axis of said collar and welded thereto for support thereof and welded at its ends to said bearing supports for support of said element and for resisting tension-producing forces transmitted thereto; a box-shaped frame-reinforcing structure for gears at one end of said frame; and a box-shaped frame-reinforcing structure having air ducts at the other end of said frame.

13. In a reciprocating engine frame construction, a base; a longitudinal row of transverse plate-like members welded to said base; spaced longitudinal members spanning and welded to said plate-like members; and a box-shaped frame-reinforcing structure at one end of said frame including side walls welded at one end thereof to opposite sides of the adjacent plate-like member, said adjacent plate-like member forming a portion of the inner transverse wall of said box-shaped structure, supporting bar-like elements welded to the other ends of said side walls and extending parallel to said adjacent plate-like member, said supporting bar-like elements being thick relative to said side walls and forming a portion of the outer transverse wall of said structure, a heavy casting forming another portion of said outer transverse wall, and means removably securing said casting to said bar-like elements.

14. In a reciprocating engine frame construction, a base; a longitudinal row of transverse plate-like members welded to said base; spaced longitudinal members spanning and welded to said plate-like members; and a box-shaped frame-reinforcing structure at one end of said frame including side walls welded at one end thereof to opposite sides of the end plate-like member adjacent thereto, said end plate-like member forming a portion of the inner transverse wall of said box-shaped structure, supporting bar-like elements welded to the other ends of said side walls and extending parallel to said end plate-like member, said supporting bar-like elements forming a portion of the outer transverse wall of said structure, a heavy casting forming another portion of said outer transverse wall, means removably securing said casting to said bar-like elements, and longitudinal ribs reinforcing each of said side walls, the ribs of each side wall being welded thereto, to the adjacent supporting bar-like element and to the adjacent portions of said end plate-like member.

15. In a reciprocating engine frame construction, a base; a longitudinal row of transverse plate-like members welded to said base; spaced longitudinal members spanning and welded to said plate-like members; and a box-shaped frame-reinforcing structure at one end of said frame, forming a gear compartment, including side walls welded at one end thereof to opposite sides of the adjacent end plate-like member, said end plate-like member forming a portion of the inner transverse wall of said box-shaped structure and having a gear support welded thereto in said compartment, supporting bar-like elements welded to the other ends of said side walls and extending parallel to said end plate-like member, said supporting bar-like elements forming a portion of the outer transverse wall of said structure, a heavy casting forming another portion of said outer transverse wall, means removably securing said casting to said bar-like elements, and a right angular rib reinforcing one of said side walls, having a longitudinal portion welded to said one side wall and to the adjacent supporting bar-like element and a transverse portion welded to said end plate-like member and said gear support.

16. In a reciprocating engine frame construction, a base; a longitudinal row of transverse plate-like members welded to said base; spaced longitudinal members spanning and welded to said plate-like members; and a box-shaped frame-reinforcing structure at each end of said frame, each including side walls welded at one end thereof to opposite sides of the adjacent plate-like member, each of said adjacent plate-like members forming a portion of the inner transverse wall of its said box-shaped structure, and supporting members welded to the other ends of said side walls and extending parallel to said plate-like members, said supporting members each forming at least a portion of the adjacent outer transverse wall of said structure.

17. In a reciprocating engine frame construction, a base; a longitudinal row of transverse plate-like members welded to said base; spaced longitudinal members spanning and welded to said plate-like members; and a box-shaped frame-reinforcing structure at each end of said frame, each including side walls welded at one end thereof to opposite sides of the adjacent plate-like member, each of said adjacent plate-like members forming a portion of the inner transverse wall of its said box-shaped structure, supporting bar-like elements welded to the other ends of said side walls of one of said structures and extending parallel to its said adjacent plate-like member, said supporting bar-like elements forming a portion of the outer transverse wall of its said structure, a heavy casting forming another portion of said outer transverse wall, and means removably securing said casting to said bar-like elements, and a heavy plate welded to the other ends of said side walls of the other of said structures and extending parallel to its said adjacent plate-like member forming the outer transverse wall of said other structure.

18. In a multicylinder opposed piston engine welded frame construction, a cover having two parts welded together along a longitudinal seam, one of said parts having a margin extending inwardly from said seam; cylinder parts welded to said margin inner edge; a transverse plate-like element extending parallel to the axis of a cylinder and welded at its opposite ends to frame parts for resisting tension-producing forces transmitted thereto, welded intermediate its ends to said cylinder parts and to said margin, and welded along a portion of its outer edge to said cover for support thereof; cover-supporting plates welded to the outer corners of said element and extending laterally and longitudinally therebeyond, welded at their inner edges to frame parts and welded at their outer edges to said cover; a transverse plate-like element at one side of and spaced from said first mentioned element; and transverse members spanning said elements, spaced longitudinally thereof and welded thereto and to said cylinder parts and welded at their outer edges to said cover.

19. In a multicylinder opposed piston engine welded frame construction, a cover; a transverse plate-like element extending parallel to the axis of a cylinder and welded at its opposite ends to frame parts for resisting tension-producing forces transmitted thereto, welded intermediate its ends to cylinder parts for support thereof and welded along a portion of its outer edge to said cover; a shaft housing welded to said cover; cover-supporting plates welded to the outer corners of said element and extending laterally and longitudinally therebeyond, welded at their inner edges to frame parts and welded at their outer edges to said cover, one of said plates being welded to the portion of said cover to which said housing is welded for support of same; a transverse plate-like element at one side of and spaced from said first mentioned element; and transverse members spanning said elements, spaced longitudinally thereof and welded thereto and to said cylinder parts and welded at their outer edges to said cover, one of said members being welded to said cover portion and plate supporting said housing.

20. In a multicylinder reciprocating engine welded frame construction, a member comprising two spaced bar-like portions extending parallel to the axis of a cylinder and welded at their ends to frame parts for resisting tension-producing forces transmitted thereto; and a lateral web connecting said bar-like portions, said bar-like portions being disposed in the lines of action of the tension loads produced by the gas loads of said cylinder.

21. In a multicylinder reciprocating engine welded frame construction, a crankshaft bearing support; a cap therefor; bolts securing said cap to said support; and a member including two spaced bar-like portions extending parallel to the axis of a cylinder and welded at corresponding ends to said support and at opposite ends to a frame part, and a lateral web connecting said bar-like portions, said bar-like portions being disposed in line with said bolts for resisting tension-producing forces produced by the gas loads of said cylinder.

22. In a multicylinder reciprocating engine welded frame construction, a plate-like element comprising a bar-like portion extending parallel to the axis of a cylinder and welded at its ends to frame parts for resisting tension-producing forces transmitted thereto; and a web integral with and extending laterally inwardly from said bar-like portion.

EVERETT CHAPMAN.
JOSEPH BARRAJA-FRAUENFELDER.

REFERENCES CITED

The following references are of record in the file of this patent:

UNITED STATES PATENTS

| Number | Name | Date |
|---|---|---|
| 1,164,674 | Sturtevant | Dec. 21, 1915 |
| 1,814,802 | Herr | July 14, 1931 |
| 1,968,110 | Walker | July 31, 1934 |
| 2,014,935 | Hefti | Sept. 17, 1935 |
| 2,159,006 | Chapman | May 23, 1939 |
| 2,246,857 | Owens et al. | June 24, 1941 |